(12) United States Patent
Skinner et al.

(10) Patent No.: US 6,341,879 B1
(45) Date of Patent: Jan. 29, 2002

(54) HIGH OUTPUT FLAT-PANEL DISPLAY BACK LIGHT MODULE

(75) Inventors: Dean W. Skinner, Vestal, NY (US); Lawrence T. Guzowski, Newington, CT (US)

(73) Assignee: Rainbow Displays, Inc., Endicott, NY (US)

( * ) Notice: Subject to any disclaimer, the term of this patent is extended or adjusted under 35 U.S.C. 154(b) by 0 days.

(21) Appl. No.: 09/407,620

(22) Filed: Sep. 28, 1999

(51) Int. Cl.[7] .......................... F21V 23/00; F21V 29/00; F21V 13/12
(52) U.S. Cl. ...................... 362/295; 362/218; 362/222; 362/225; 362/243; 362/294; 349/70
(58) Field of Search ................................. 362/216, 222, 362/225, 247, 251, 260, 295, 394, 395, 411, 294, 218, 273, 242–246; 349/67, 70

(56) References Cited

U.S. PATENT DOCUMENTS

| | | | | |
|---|---|---|---|---|
| 4,404,619 A | * | 9/1983 | Ferguson | 362/222 |
| 4,564,886 A | * | 1/1986 | Morcheless | 362/97 |
| 4,943,689 A | * | 7/1990 | Siefer et al. | 362/97 |
| 4,945,350 A | * | 7/1990 | Kawamura | 349/70 |
| 5,661,531 A | | 8/1997 | Greene et al. | 349/73 |
| 5,720,545 A | * | 2/1998 | Shaw | 349/67 |
| 5,808,418 A | * | 9/1998 | Pitman et al. | 315/115 |
| 5,867,236 A | * | 2/1999 | Babuka et al. | 349/73 |
| 5,903,328 A | | 5/1999 | Greene et al. | 349/73 |

* cited by examiner

Primary Examiner—Alan Cariaso
(74) Attorney, Agent, or Firm—Salzman & Levy

(57) ABSTRACT

The present invention features a system for uniformly distributing luminance and a high degree of collimation from a back light module for a flat-panel, liquid crystal display (LCD). A constant and uniform luminance output of the back light module is obtained through appropriate selection of lamps, geometry and optical components. An appropriate balance of lamps, lamp spacing, reflective light back plane, and diffuser and collimating optics are chosen to produce a high brightness back light module with very high intensity output over very large surfaces. Variations in intensity over the illuminated area are minimized using light recycling in conjunction with the collimating optics. Optimum geometries are determined for the purpose of maximizing light output at high efficiencies, while minimizing luminance gradients across the display. Finally, a precise collimator eliminates light beyond a defined angle, as required in a tiled, flat-panel LCD.

19 Claims, 13 Drawing Sheets

HIGH OUTPUT FLAT-PANEL DISPLAY BACK LIGHT MODULE

FIELD OF THE INVENTION

This invention pertains to back light systems for flat-panel displays and, more particularly, to a back light system that produces high intensity, collimated light for very large flat-panel displays.

BACKGROUND OF THE INVENTION

Large flat-panel displays made in accordance with known active matrix (or TFT) liquid crystal display technologies are typically mounted in front of a back light module which contains an array of fluorescent lamps. FPDs of this type have been increasing in size by about 1 to 2 inches diagonal yearly. The median size in 1999 for use in desk top PCs is about 15 inches diagonal view area. A few very large displays are made in the range of 20 to 25 inches diagonal. Tiled AMLCD FPDs may be made in the range of 40 inches diagonal, as described in copending U.S. patent application Ser. no. 09/368,921, assigned to the common assignee and hereby included as reference. However, tiling, as described in U.S. Pat. No. 5,661,531 and also included as reference requires extremely intense light sources with substantially collimated lighting, masked optical stacks, and pixel apertures that have very low emitted light efficiency. Thus, lighting with unusually high intensity ranges of 50,000 to 150,000 nits is desirable with uniformity over very large FPD areas. Unique designs, and control features are necessary to achieve such high intensities at reasonable wattages for consumer or business applications. Maintaining a bright and uniform illumination of the display over its entire active area is difficult to do. The intensity required for some applications and, in particular, that required for a large, tiled, seamless flat-panel LCD display causes the lamps to produce a significant amount of heat. In addition, fluorescent lamps are designed to run most efficiently at an elevated temperature, so it is desirable to operate them at their ideal design temperature, which is usually about 50 to 60 degrees Centigrade.

Small, edge-lit back light modules used in notebook or laptop PCs do not produce sufficient brightness for a large area display, nor are they capable of illuminating a large area uniformly. Thus, it is necessary to illuminate the area with an array of fluorescent lamps. The number of lamps required depends on the size of the area to be illuminated and the display brightness specifications. A large area display requires multiple lamps to illuminate it properly.

Since most displays are designed to be wider than they are tall, it is advantageous, from a reliability and power perspective, to use horizontal lamps. This results in fewer lamps and less power, since less lamp cathodes are present. The resultant proffered designs orient lamp tubes horizontally, one above the other with predetermined preferred angular and spacing relationships for increasing reflective efficiency of the back wall of the cavity.

The present invention provides a mechanism for using an array of high output and efficient fluorescent lamps for producing maximum brightness. Additionally, the back light assembly cavity of the inventive apparatus is treated with a highly diffuse and efficient reflective surface. Also added are commercially available optics, such as Brightness Enhancing Films (BEFs) and a diffuser for maximizing the output of the BEFs, reflector, and back light geometry.

The invention also provides for a very uniform light field across the back light exit surface.

The invention further provides means for incorporating a sharp cut-off collimator, as described in U.S. Pat. No. 5,903,328, hereby incorporated by reference.

Additionally, when used with the invention described in copending U.S. patent applications, Ser. Nos. 09/407,619 and 09/406,977, both filed concurrently herewith and also hereby incorporated by reference, the apparatus of this invention provides a very uniform, high luminance back light system capable of maintaining display brightness under a wide range of environments over long periods of time. It is particularly suited for illuminating a large tiled, seamless flat-panel LCD.

SUMMARY OF THE INVENTION

In accordance with the present invention, there is provided a system for uniformly distributing luminance from a back light module for a flat-panel, liquid crystal display (LCD). Fluorescent lamps are commonly used in back light modules for LCDs due to their high efficiency. Luminance from fluorescent lamps is a function of lamp tube temperature, as is the efficacy and also lamp life. This invention provides means for achieving luminance uniformity and a high degree of collimation.

A highly efficient and diffuse reflective surface treatment is disclosed. Reflection efficiency of this invention is significantly higher than other available treatments for large areas. In particular, a constant and uniform luminance output of the back light module is obtained through appropriate selection of lamps, geometry and optical components. A preferred balance of lamps, lamp spacing, reflective light back plane, and diffuser and collimating optics are chosen to produce a high brightness back light module with very high intensity output over very large surfaces. The variations in intensity over the illuminated area are minimized using light recycling in conjunction with the collimating optics. Variations are further reduced by incorporating the invention disclosed in patent application Ser. No. 09/406,977.

This invention provides means for achieving this goal through selection of combinations of components and appropriately designed geometry. A particular application is a large, tiled, flat-panel display having visually imperceptible seams as described in the aforementioned U.S. patent application, Ser. Nos. 08/652,032, 09/368,291, and U.S. Pat. No. 5,903,328. The back light module system, with thermal enhancements such as those disclosed in Ser. No. 09/406,977 and applicable controls, such as those disclosed in Ser. No. 09/407,619 provides for an efficient, reliable, large area, high intensity light source for flat-panel displays.

Additionally, optimum geometries are determined for the purpose of maximizing light output at high efficiencies, while minimizing luminance gradients across the display. These optimum geometries are also determined for maximizing light output using BEFs and light recycling.

Finally, a precise collimator such as that disclosed in Ser. No. 09/024,481 is added which eliminates light beyond a defined angle, as required in a tiled flat-panel LCD.

BRIEF DESCRIPTION OF THE DRAWINGS

A complete understanding of the present invention may be obtained by reference to the accompanying drawings, when considered in conjunction with the subsequent, detailed description, in which:

FIG. 2b illustrates a planar view of the multiple lamp back light depicted in FIG. 2a;

For purposes of both clarity and brevity, like elements and components will bear the same designations and numbering throughout the figures.

DESCRIPTION OF THE PREFERRED EMBODIMENT

Generally speaking, the invention features apparatus and a method for controlling the luminance uniformity and collimation of light exiting a large area back light for a flat-panel display. A back light for a large tiled, flat-panel display requires high luminance levels and a precise predetermined degree of collimation. In addition, the invention provides an optimum design for the efficiency, cooling, luminance and image quality desired in a large, flat-panel display, particularly a tiled LCD.

Figure 1:
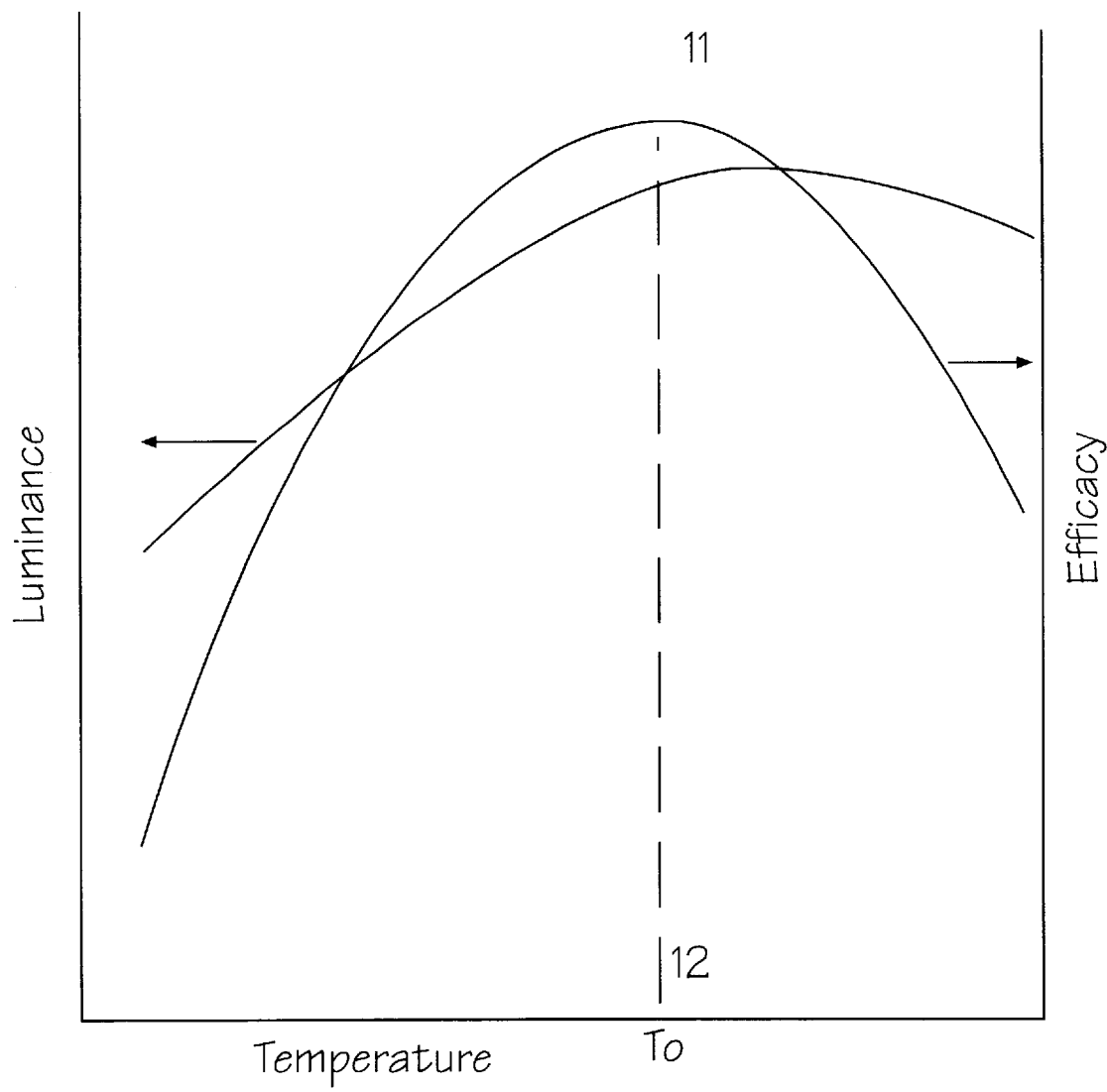
FIG. 1 graphically illustrates the temperature characteristics of a fluorescent lamp

Now referring to FIG. 1, a typical fluorescent lamp (not shown in the FIGURE) is designed to operate most efficiently at a predetermined lamp tube wall temperature. Maximum brightness occurs near the point of maximum efficacy 11. The ideal temperature then is said to be $T_o$ 12. The ideal temperature 12 is determined by the lamp construction and its parameters, such as phosphors and mercury vapor pressure. The most efficient lamps are those referred to as hot cathode lamps. These lamps have a preheat cycle during which the cathodes are heated, thereby causing easier ignition of the gas.

Figure 2A:
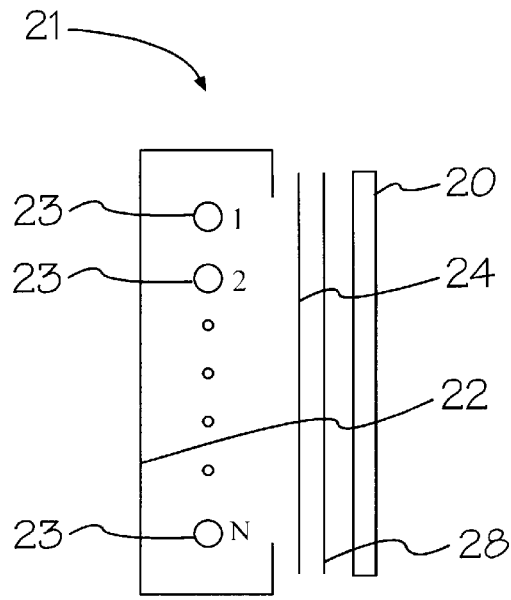
FIG. 2a illustrates a side view of a multiple lamp back light and a display in accordance with the present invention.

Now referring to FIG. 2a, , a side view of a flat-panel display 20 and its back light assembly 21 is shown. The back light assembly 21 consists of a light box cavity 22, an array of fluorescent lamps 23, and a light diffuser 24. Lamps are cooled by fans 29. Some display applications require additional optics 28 to enhance certain characteristics of the exiting light. An example is the aforementioned tiled, flat-panel LCD display, which uses highly collimated light. The additional optics 28 required to collimate the light are somewhat inefficient. This necessitates that a high luminance be produced by the back light 21.

Figure 2B:
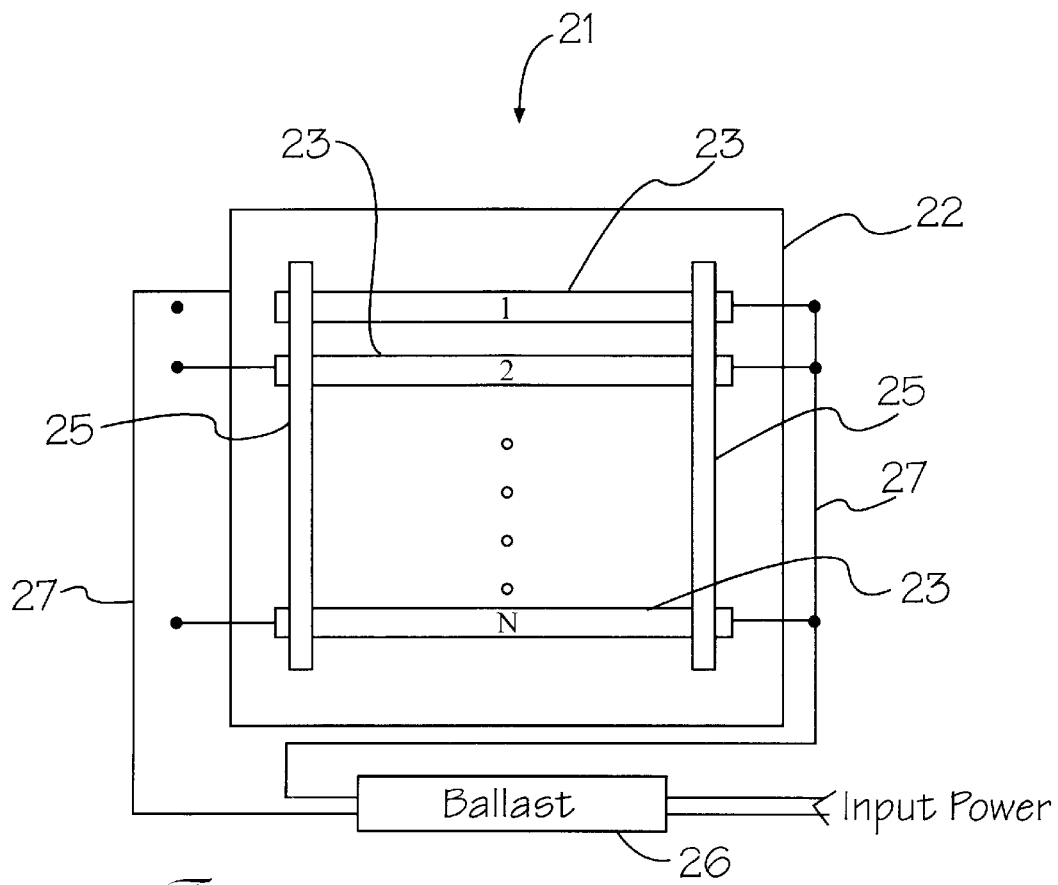

FIG. 2b shows a front view of the back light assembly 21. The lamps 23 are held in the light box cavity 22 by lamp holders 25. The lamps 23 are wired to the ballast 26 by a wiring harness 27. The ballast 26 supplies high frequency (usually 20–30 Khz) AC power to the lamps 23.

Figure 3B:
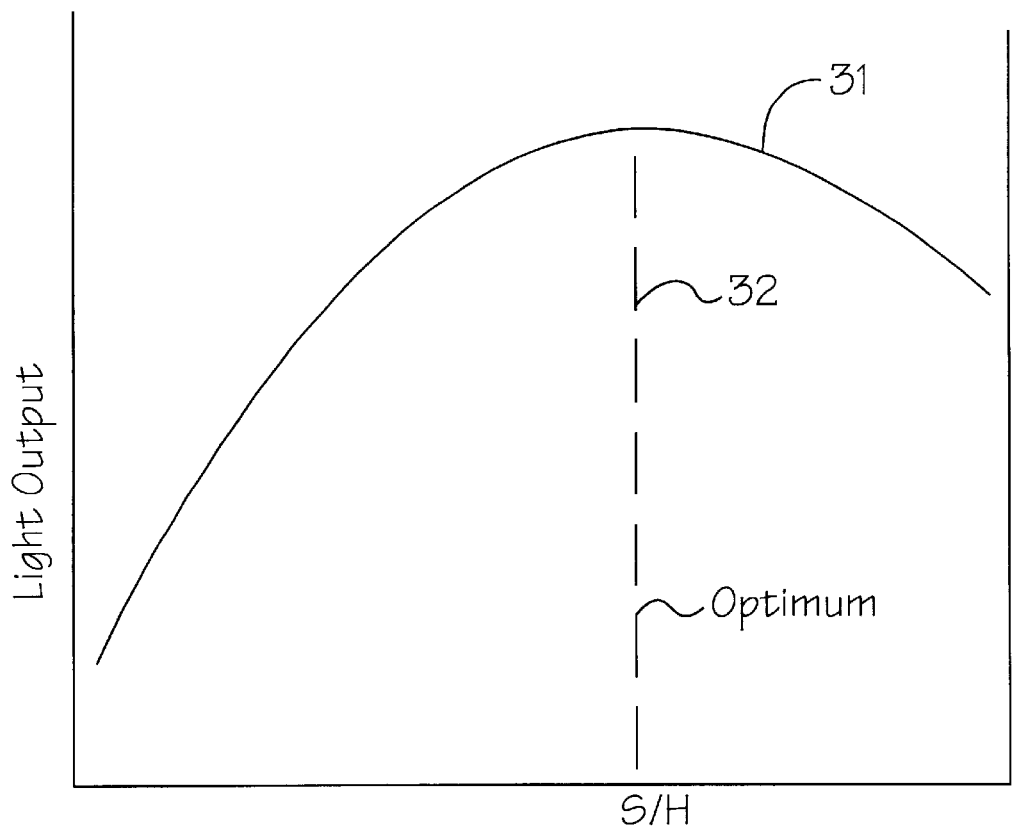
FIG. 3b graphically depicts light output as a function of lamp spacing.
Figure 3A:
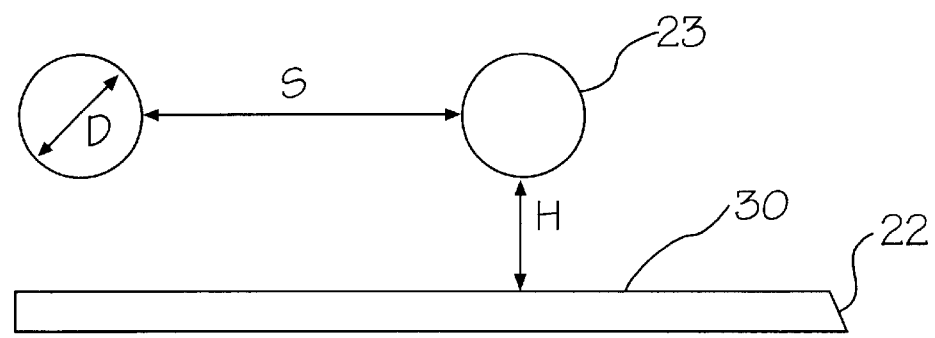
FIG. 3a is a schematic diagram illustrating lamp and reflector spacing relationships.

FIG. 3a illustrates an arrangement of lamps 23 and the reflecting back plane 30 of the back light cavity 22. Lamps 23 have a diameter D and are spaced apart by dimension S. The lamps 23 are positioned at a distance H from the back plane 30.

FIG. 3b shows the effect of changing the ratio of S to H. The light output 31 can be calculated easily by assuming that the back plane surface 30 is 100% reflective, while the lamp tubes 23 are 100% absorbing. For a given diameter D of a lamp 23 and lamp space S, there is an optimum distance 32 for the back plane surface 30 to lamp tube 23 space H.

A first approximation analysis can easily be obtained through a consideration of the geometry in FIG. 3a. Light leaving the lamp 23 exits forward toward the display, is absorbed by neighboring lamps, or is sent back to the back plane 30. It is desired to have as much light possible to reflect off the back plane. A first approximation is to assume that the back plane is a mirror; in reality it is a diffusive reflector. The lamp is assumed to be a line source.

Light rays leaving the rear of the lamp will reflect back into the lamp if they leave the lamp at angles smaller than B. If the exiting angle is larger than A, the light will be absorbed by neighboring lamps. Light rays exiting the rear of lamp 23 that have exit angles between A and B will escape forward through the interlamp space S. A first approximation of angle A is $$A = \tan^{-1} \frac{(D/4)}{(H+D/2)}$$

A first approximation for the angle B is $$B = \tan^{-1} \frac{(S+D/2)}{(H+D/2)}$$

The escape angle is then $$E = A - B$$

There is a value H, given S and D, that maximizes the light escape angle E. The maximum is found by setting the differential equal to zero. That is $$\frac{dE}{dH} = 0 = \frac{dA}{dH} - \frac{dB}{dH} = \frac{d}{dH}\left\{\tan^{-1}\frac{D}{2(2H+D)} - \tan^{-1}\left(\frac{2S+D}{2H+D}\right)\right\}$$

Figure 4:
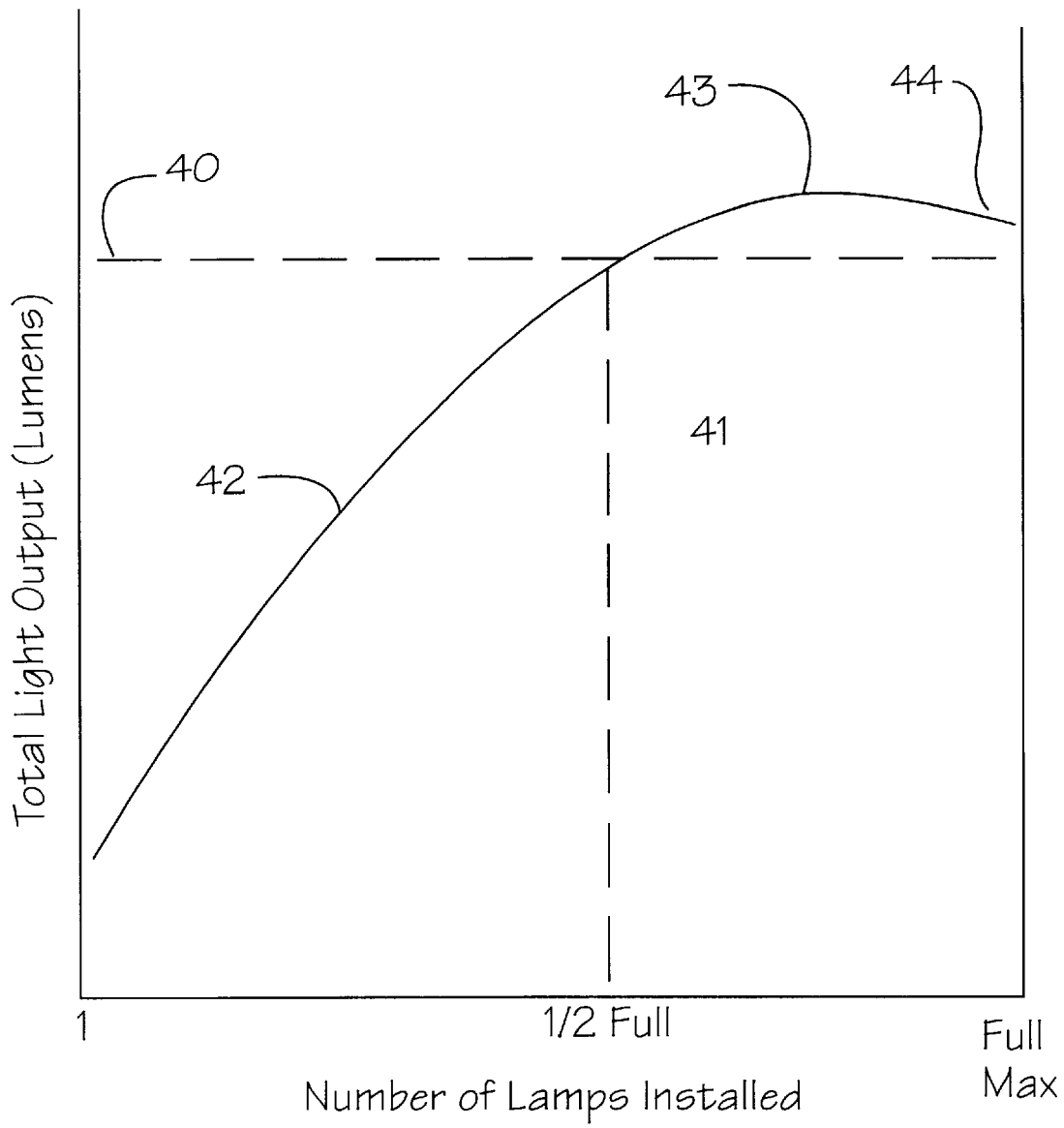
FIG. 4 is a graph depicting light output as a function of the number of lamps.

FIG. 4 illustrates the results of an analysis to determine the number of lamps 23 to be used in a back light assembly 21 having a predetermined size. The assumptions are the same as used to generate FIG. 3b. In addition, the optimum lamp 23 to reflective back plane 30 space H was chosen for calculation. The curve of total light output from the back light cavity 42 is shown as a function of the number of lamps installed. The desired light level 40 is also presented. It will be noted that, as the number of lamps increase, the light output increases until a maximum illumination 43 occurs prior to reaching the point of maximum lamp capacity 44.

The lamps 23 block light reflected from the reflector surface 30, from the rear half of the lamp tube. Also, as more lamps are used, spaced closer together, they block light from each other. The number of lamps 41 corresponding to the desired light output 40 is also shown.

A good approximation of the total light output of the back light assembly, without considering collimation and related light recirculation, can be obtained by considering the geometry. A lamp tube 23 produces light rays uniformly over 360 degrees. The light exits forward toward the display, is absorbed by neighboring lamps or it exits rearward and hits the reflective back plane 30. The light reflecting off the back plane 30 either exits the back light through space S or is absorbed by a lamp.

The light absorbed by a neighboring lamp can be expressed by the angle of light rays leaving the lamp. Or $$\phi_1 = \sin^{-1}\left(\frac{D}{S+D}\right)$$

The space S is given by the number of lamps N housed in the width W of the back light cavity, and is $$S = \frac{W - ND}{N - 1}$$

The light exiting forward is given by its angle $\phi_{forward} = 180 - 2\phi_1$ The light exiting rearward is the same as the forward, but the light then reflected out of the back light cavity from the back plane is $$\phi_{back} = \frac{S}{D+S} \phi_{forward}$$

The total light exiting from the back light assembly is L:

$$L = \frac{Nl}{360} \{\phi_{forward} + \phi_{back}\}$$

where l is the total light output of one lamp. The results are plotted in FIG. 4.

Since the power consumed by each lamp 23 is constant, efficiency is related to light output and the number of lamps. The curve 42 is nearly linear until the number of lamps approaches 50% of the maximum that can be installed in the allotted space. It is desirable then to choose a light output design point near this inflection point. Thus, an optimum number of lamps 41 is shown in FIG. 4.

Figure 5:
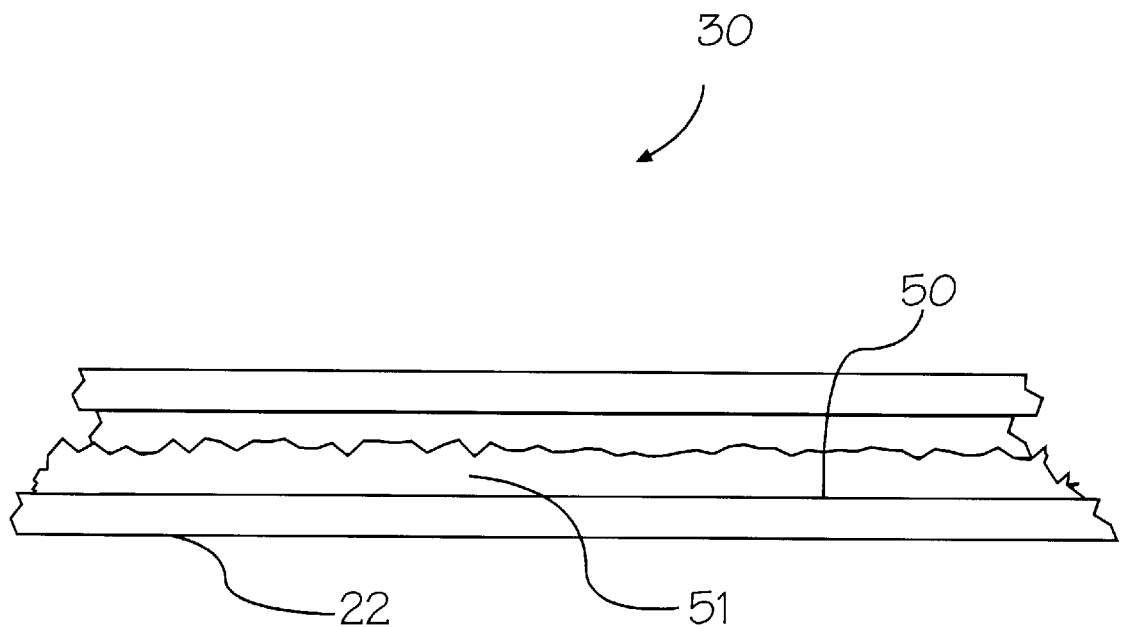
FIG. 5 is a schematic view of a high efficiency reflective surface treatment.

FIG. 5 shows a unique surface treatment for the back plane 30 of the back light cavity 22 of the back light assembly 21. The back light cavity 22 is constructed of aluminum with a moderately high gloss finish 50. A somewhat reflective white powder coat of paint 51 is applied to the aluminum back plane 30. The surface texture finish of the paint 51 is chosen through experiment to best reflect diffuse light.

The texture features of peak-to-peak roughness and off-planar angularity of the microsurfaces are chosen to reflect and disperse light without imaging shadows of the texture details. Next, a white Teflon sheet is applied to the back plane 30 using an optically clear adhesive. The Teflon sheet is a commercially available product with a high loading of titanium dioxide powder filler. The film is sufficiently thick to maximize the reflected light. Specific designs use a 0.05 mm thick paint 51 and 0.25 mm of Teflon material.

Figure 6:
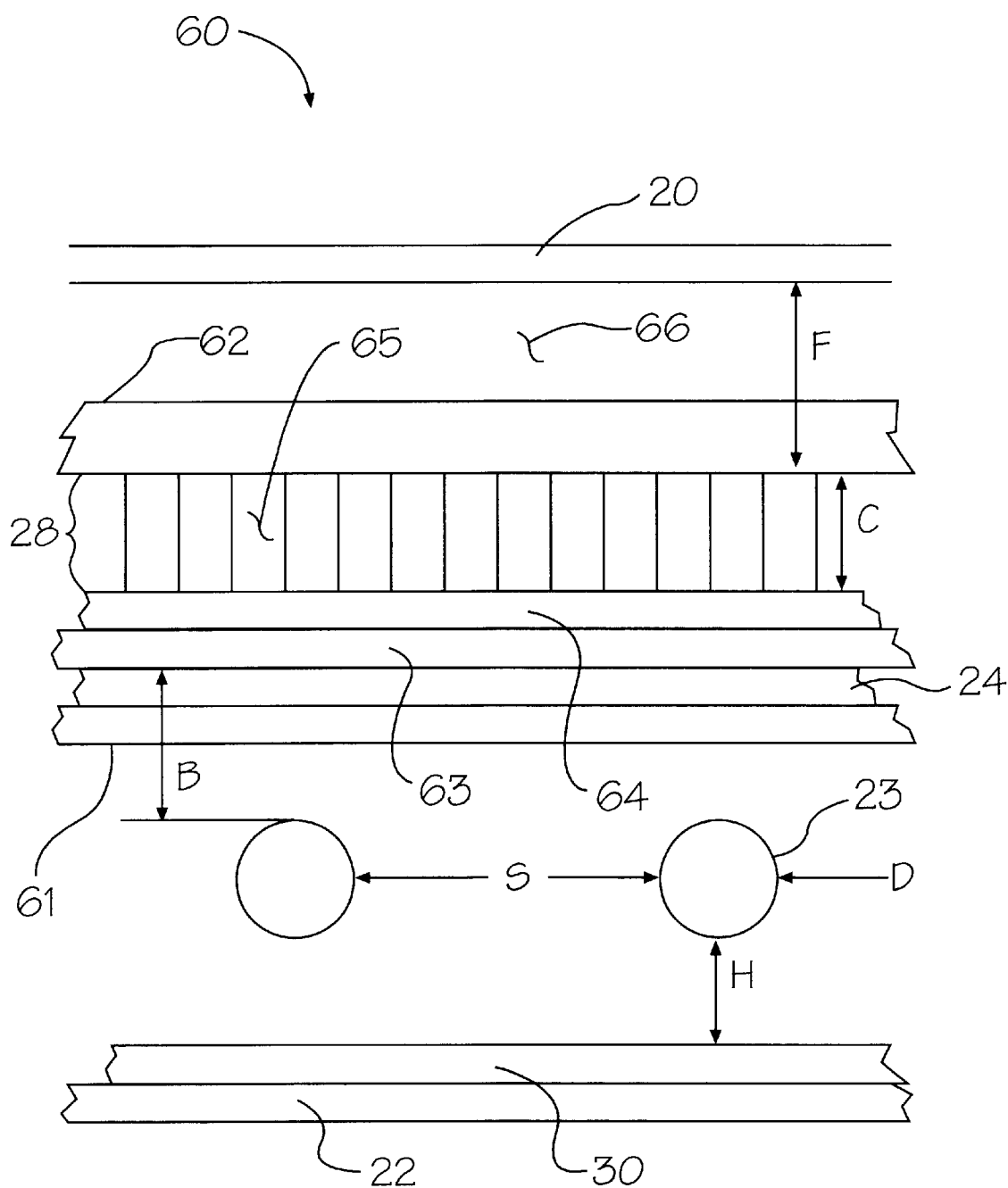
FIG. 6 depicts a back light design with display, in accordance with the present invention.

Now referring to FIG. 6, there is shown a cross sectional view of a back light assembly 21 with additional optics 28 and flat-panel display 20. The back light assembly 21 consists of a back light cavity 22 with reflecting back plane lamps 23 and a glass cover plate 61. A diffuser is added to complete the back light assembly 21.

Collimating optics consist of crossed BEFs 63 and 64 and a collimator 65. The diffuser and collimating optics are sandwiched between two glass plates 61 and 62. These plates 61 and 62 may be any optically clear, with enough stiffness to support the film optics over the expanse needed. A flat-panel display 20 is placed in front of the optics assembly 28 by a distance F, leaving an air space 66. This air space 66 is vented to ambient air to allow for further cooling of the display 20.

As aforementioned, the collimating optics makes use of BEFs. A BEF accepts light at high angles of incidence and sends light at near normal angles of incidence back to the back light assembly for recycling. It is desirable to have as much reflective area available as possible for the BEFs. However, more lamps produce more light output. The first pass design choice for lamp spacing S is increased slightly. Specifically, 10% fewer lamps are used. The coupling of light into the BEFs 63 and 64 is also affected by the distance B that they are placed from the lamps 23.

The luminance output of the BEFs increases with proximity to the lamps, but luminance uniformity decreases with closeness to the lamps. For practical reasons a reasonable space is required between the lamps and the glass optics holder 61 for air flow to cool the cavity 22.

The preferred diffuser 24 is a high transmission holographic type diffuser which is chosen to have a near Lambertian distribution in order to couple a maximum amount of light into the BEFs 63 and 64 and to permit a maximum amount of recycling in the back light cavity 22. The diffuser 24 need not be of the holographic type, but is must have high transmission efficiency and produce a Lambertian distribution of light. The lamps are not 100% absorbing and the reflective back plane is not 100% reflecting, although reflectivity is greater than 95%. Accordingly, fine tuning is necessary in the design parameters of lamp spacing, back plane space, and BEF spacing to the lamps.

The collimator 65, also disclosed in the aforementioned U.S. Pat. 5,903,328, consists of open hexagonal cells in a honey comb configuration, coated with a highly light-absorbing paint. The aspect ratio of cell width to cell depth determines the cut-off angle or collimation angle.

The use of a sharp cut-off collimator is preferred in a seamless, tiled, flat-panel display. Untiled, large displays do not require a sharp cut-off collimator. Unfortunately, the collimator, having a physical structure, creates a shadow image which can be seen on the display. To prevent imaging of the collimator, the display is placed further away so that cell images overlap, or are defocused, and therefore are not visible to the viewer.

Figure 7:
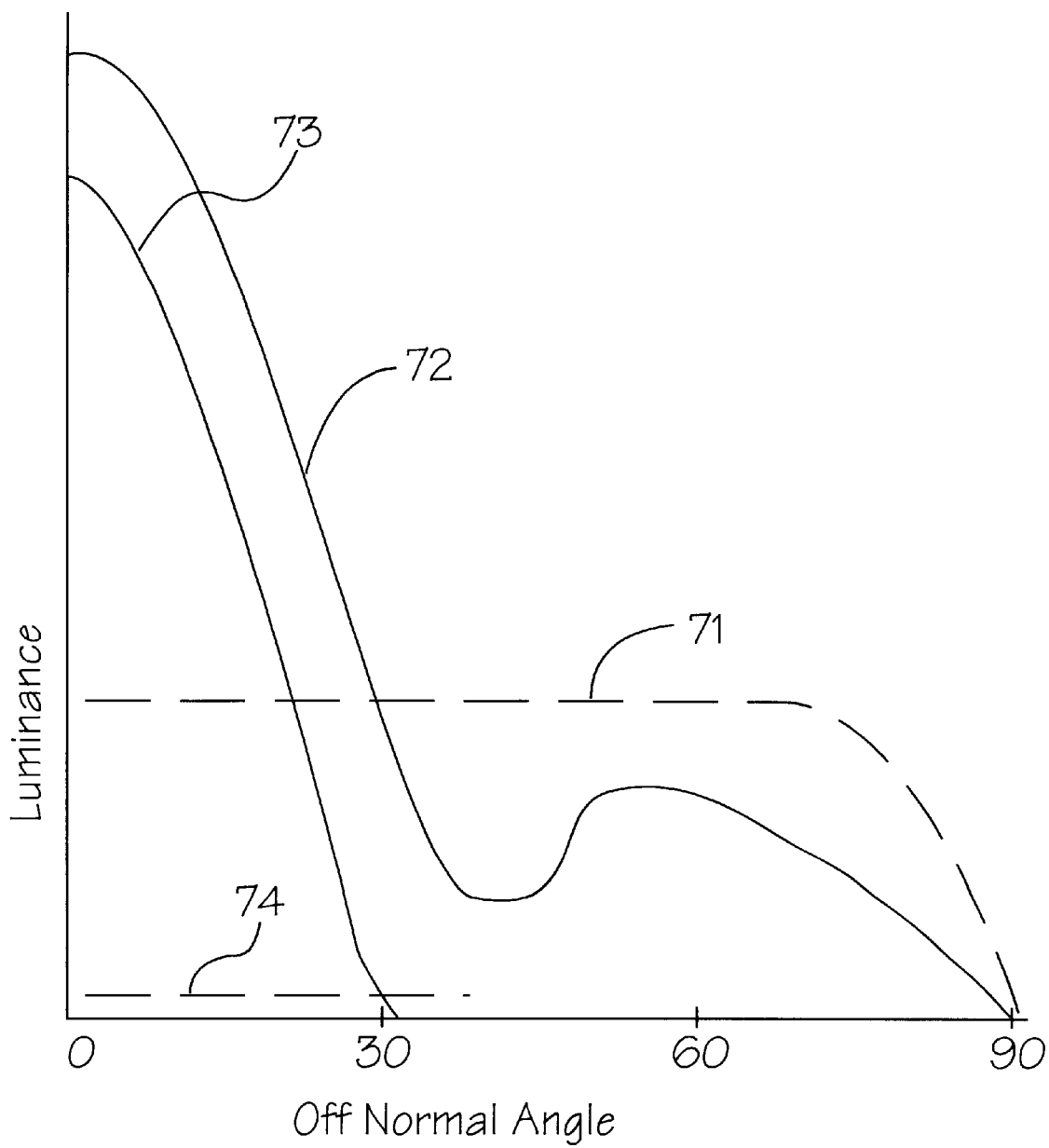
FIG. 7 graphically illustrates the collimation attributes of the optics.

FIG. 7 depicts the degree of collimation or angular distribution of light emitted from each of the optical components. The diffuser 24 emits a Lambertian distribution 71, as stated hereinabove. The BEFs focus light forward in a distribution 72 that has a theoretical forward gain of 2.2 for the type used herein. Actual achieved forward gain is about 1.9. The BEF distribution 72 has a significant amount of light energy remaining beyond the cut-off angle (~30° in the preferred embodiment) desired for a seamless, tiled, flat-panel display.

The collimator eliminates such unwanted light by cutting off light beyond the collimation angle, as shown by its emission distribution 73. The surface absorption of the collimator cell must be sufficient to prevent luminance of more than 1% of normal luminance beyond the collimation angle.

Brightness levels far exceeding industry capability have been achieved. Luminance values exceeding 100,000 nits (candellas/square meter) have been reached. Reasonable designs with exceptional efficiency have been prototyped with luminance output exceeding 50,000 nits, a uniformity of luminance of 10% at an efficiency better than any commercially available unit even at lower brightness levels.

Figure 8:
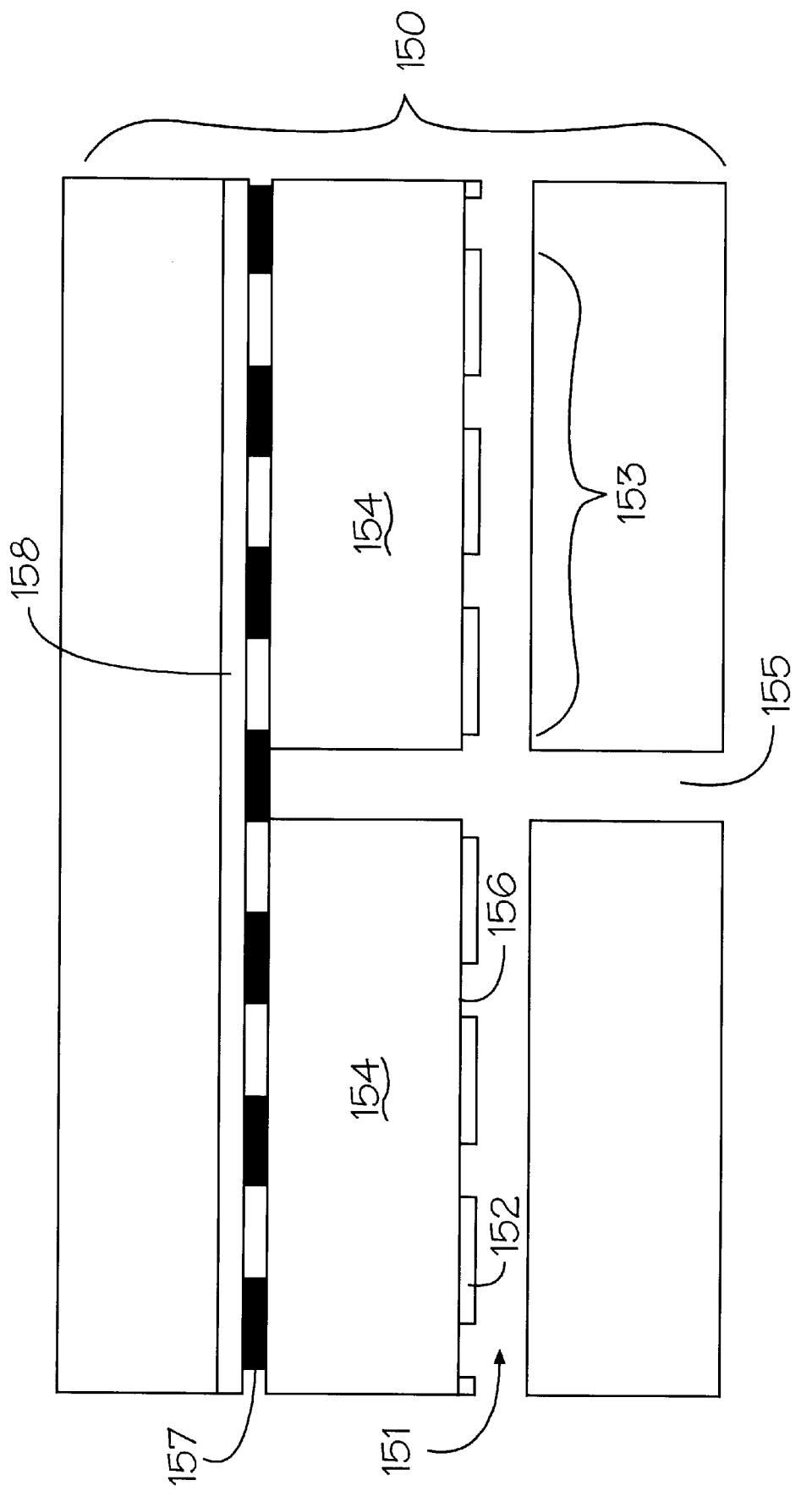
FIG. 8 shows a schematic, cross-sectional view of a tiled, color display having invisible seams.

Now referring to FIG. 8, one embodiment of a seamless, tiled display is illustrated in cross-sectional view. The seamless display 150 comprises an image source plane 151 comprising a color filter layer 152 and lightvalve layer aperture areas 153. It should be understood that the image source plane 151 can be disposed anywhere between the viewer and the source. The tiles are presented by the glass layers 154, which are separated by a gap 155. This gap 155 and the areas between the lightvalve areas 56 are covered by a mask 157, in order to make the image source plane uniform. An overlaid screen surface 158 is used to project the image source plane into the image view plane. A lens surface may be used, instead of the screen surface 158, for generating the image view plane.

When the seam 155 is blocked from the backlight source, the seam is still noticeable because of ambient light and scattered light from the sides of the tiles. However, when the seam 155 is blocked directly from above, using a mask 157, which is aligned to the tiles and lightvalves of the display, then the seam is not perceptible when viewed directly along the surface normal. However, for sufficiently large viewing angles away from the surface normal, the seam 155 is no longer shadowed by the mask 157, and thus becomes visible. If the view angle range for seamless appearance is unacceptably small, it can be enhanced through the use of a microlens array. The closer the screen 158 can be placed to the mask 157, the larger the view angle range becomes for seamless appearance. The mask reduces the transmitted light flux significantly. A thin polarizer layer 159 can be placed between the image source plane 151 and the screen 158.

Figure 9:
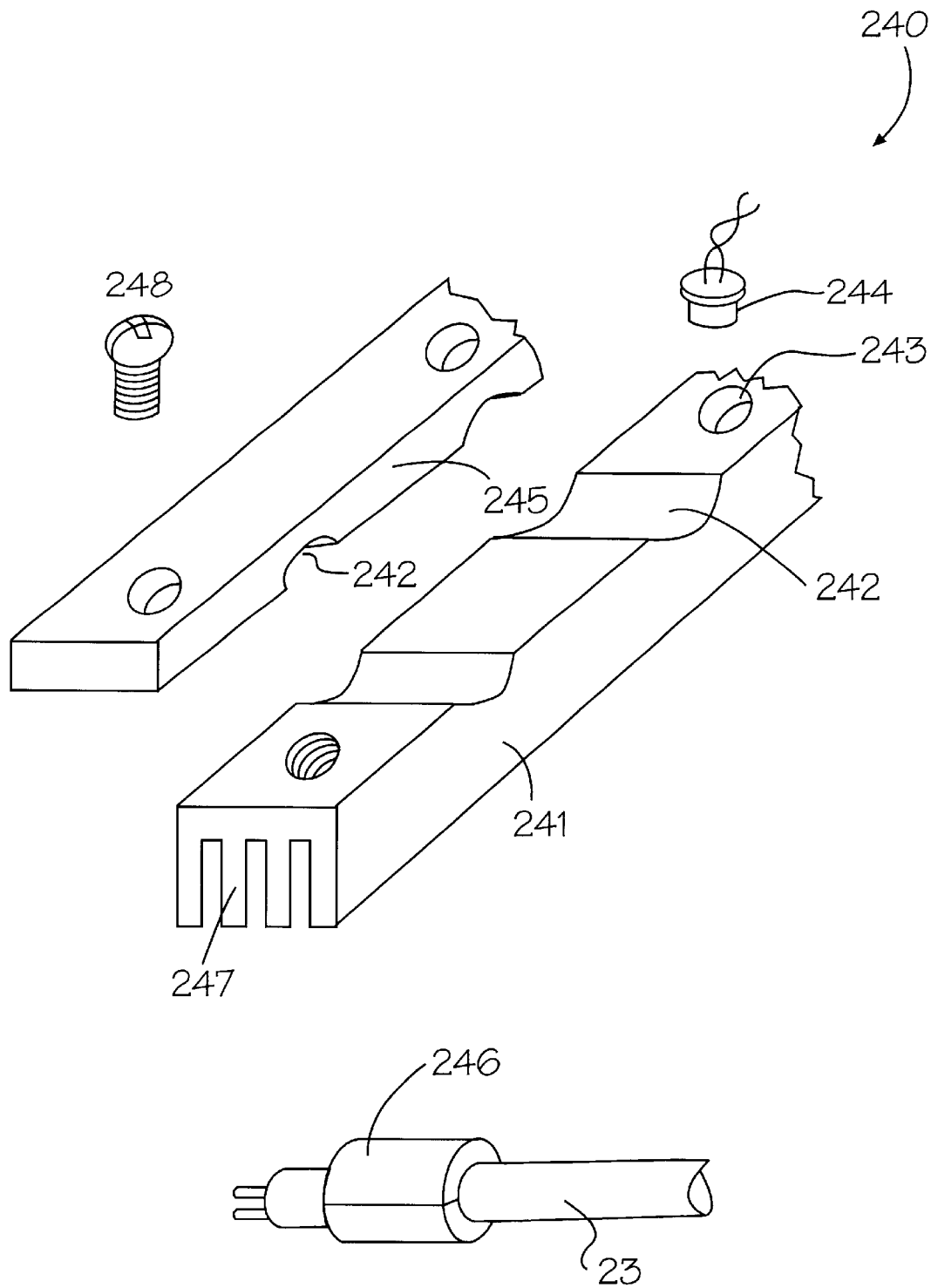
FIG. 9 depicts a heat sink used to cool the lamp ends, in accordance with the present invention.

FIG. 9 is an exploded view of a cathode heat sink assembly 240 in accordance with the invention. The heat sink assembly 240 serves as a lamp holder (not shown) as well. The heat sink assembly 240 covers the cathode area of the fluorescent lamps 23 (FIG. 2b). The heat sink assembly 240 consists of two mating parts: the heat sink body 241 and the heat sink cap 245. Both of these two parts 241 and 245 have respective, essentially semicircular cavities 242 for receiving lamps 23. The two mating parts 241 and 245 are held together by fasteners 248.

Prior to placing the lamps 23 into the heat sink cavities 242, thermally conductive elastomeric tape 246 is placed around the lamps 23 in the cathode area. The thermal tape 246 provides compliance so that the lamp tubes 23 are not overly stressed during assembly. High viscosity thermal grease can be used in conjunction with the tape 246.

A thermal sensor 244 is mounted in the heat sink body 241 using thermal adhesive. The heat sink temperature is uniform across the lamps 23. The temperature at the top of the heat sink 240 is the most indicative of the lamp temperatures in the back light cavity 22 (FIG. 2b). The temperature at the sensor 244 represents the lamp cathode heat plus some of the heat produced in the chimney of the lamp array 23. The output of the sensor can be used to regulate the speed of cooling fans (not shown). The use of fans to cool a light box, of course, is well known to those skilled in the art.

The heat sink assembly 240 is mounted in the back light cavity 22 with cooling fins 247 protruding from the rear of the cavity 22. This allows cool ambient air to flow convectively over the heat sink fins 247. This additionally allows the heat sink 240 to be at a near uniform temperature. The sensor 244 is located at an optimum thermal location for use in a temperature control system.

Figure 10A:
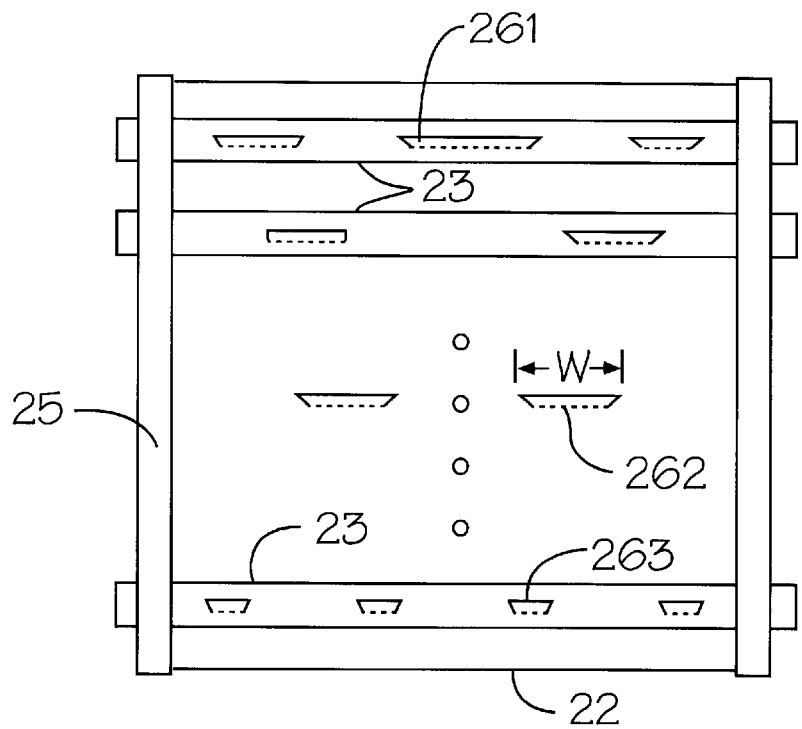
FIGS. 10a and 10b depict a back light cavity back plane with louvers.

Referring now to FIG. 10a, there is shown an array of louvers, or open slots, dispersed behind the lamps 23. Different sized louvers 261, 262 and 263 are used for thermal balancing. The louvers 261, 262 and 263 are punched into the back plane of the back light cavity 22. This plane is a highly efficient, diffusive reflector; the louver surface is reflective as well. The louvers 261, 262 and 263 present no visible slot to the viewer, due to the diffusive reflectivity characteristic of the back plane.

Figure 10B:
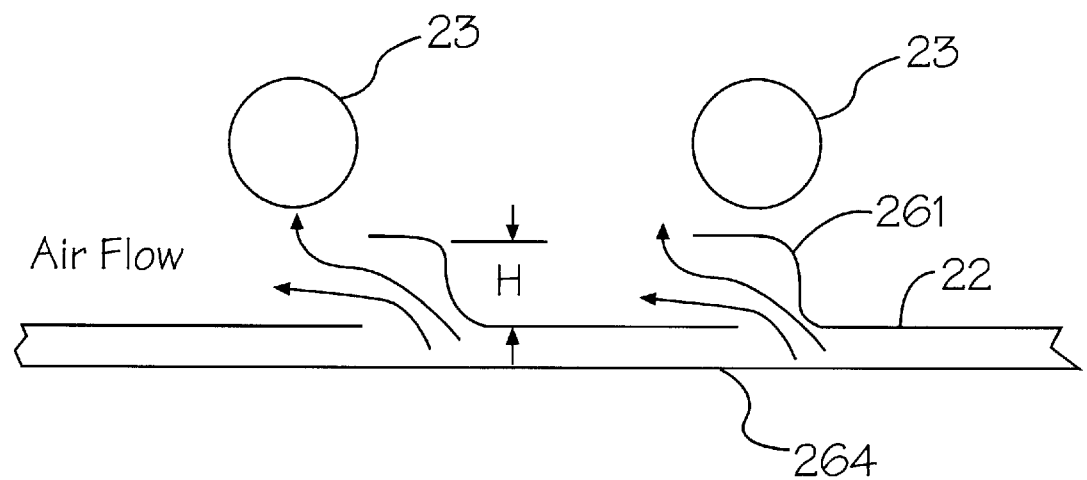

In summary, the lamp tubes 23 can be made to operate at a uniform temperature along their entire length by allowing cool ambient air pulled by fans (not shown) to enter the back light cavity 22 through louvers 261, 262 and 263 placed behind the lamps 23. A filter 264 is placed behind the back light cavity 22, as shown in FIG. 10b.

The height H and width W of the louvers 261, 262 and 263 can be determined experimentally, guided by analysis. It is desired that the air temperature and flow rate be constant along the lamp tube length. To counterbalance the chimney effect, larger and more numerous louvers are disposed at the top of the lamp array 23 and near the horizontal center. The objective is to maintain each lamp at a uniform temperature along its length, but not necessarily to maintain the same temperature from lamp to lamp.

Figure 11:
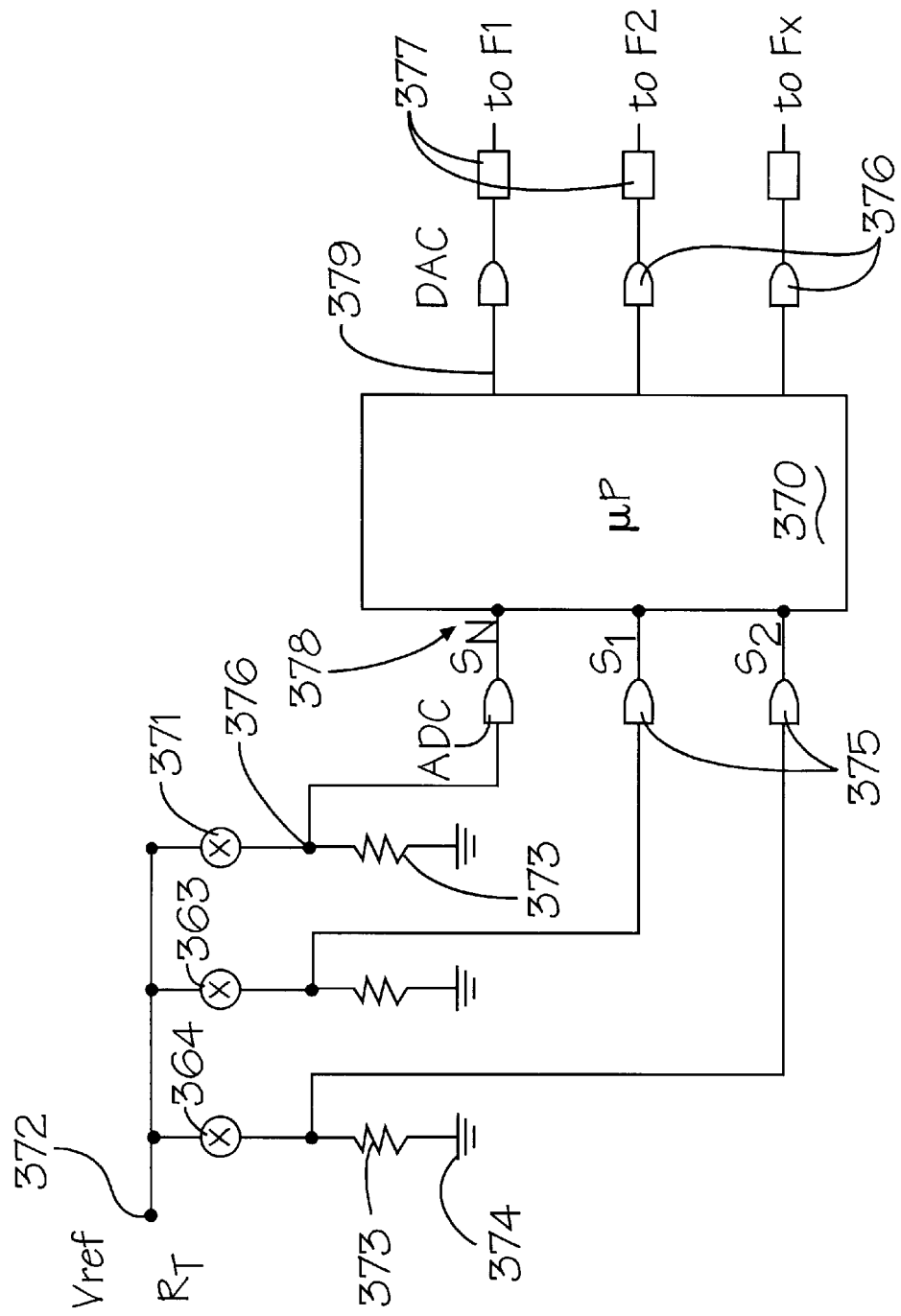
FIG. 11 is an electrical schematic diagram illustrating the fan speed control logic of the present invention.

FIG. 11 is an electrical schematic diagram that depicts a closed loop circuit for controlling fan speeds. One type of temperature sensor 371 in this embodiment is a thermistor forming part of a voltage divider network with fixed resistors 373 and held between a reference voltage 372 and ground 374. The divided voltage 376 is fed into a microprocessor 370 via analog-to-digital converters 375. The temperature sensor 371 in this embodiment can be used as sensors 363, 364.

A microprocessor 370 uses digital temperature data 378 to adjust fan speeds. The digital output 379 of the microprocessor 370 is fed into the motor drive amplifiers 377 via digital-to-analog converters 376. In this embodiment, motor drive amplifiers 377 then supply a DC voltage to the fans (not shown).

The simplest form of control algorithm adjusts the speed of all fans to be the same, based on the value of one sensor $S_1$. Air flow is uniform across the lamps 23. This is the most cost efficient control scheme. The adjustment to the microprocessor output 379 to changes in the input 378 is accomplished using a simple lookup table, not shown, which is empirically developed by actual test results. Only one sensor and one motor drive amplifier is needed for this simplest of controls.

A two zone air flow control system can be accomplished in two ways. The simplest is to thermally profile the unit during actual testing and determine the air speed ratios desired between the two zones. A more complex method is to use two sensors 363 and 364 of the type 371 for example, to independently control the air flow (a) up through the center of the back light assembly 21 and (b) for the sides of the back light assembly 21. Additional sensors and motor drive amplifiers, not shown, can be added to control the temperature distribution more accurately within the back light assembly 21. It has been found that a dual zone with one sensor is adequate for most applications.

Figure 12:
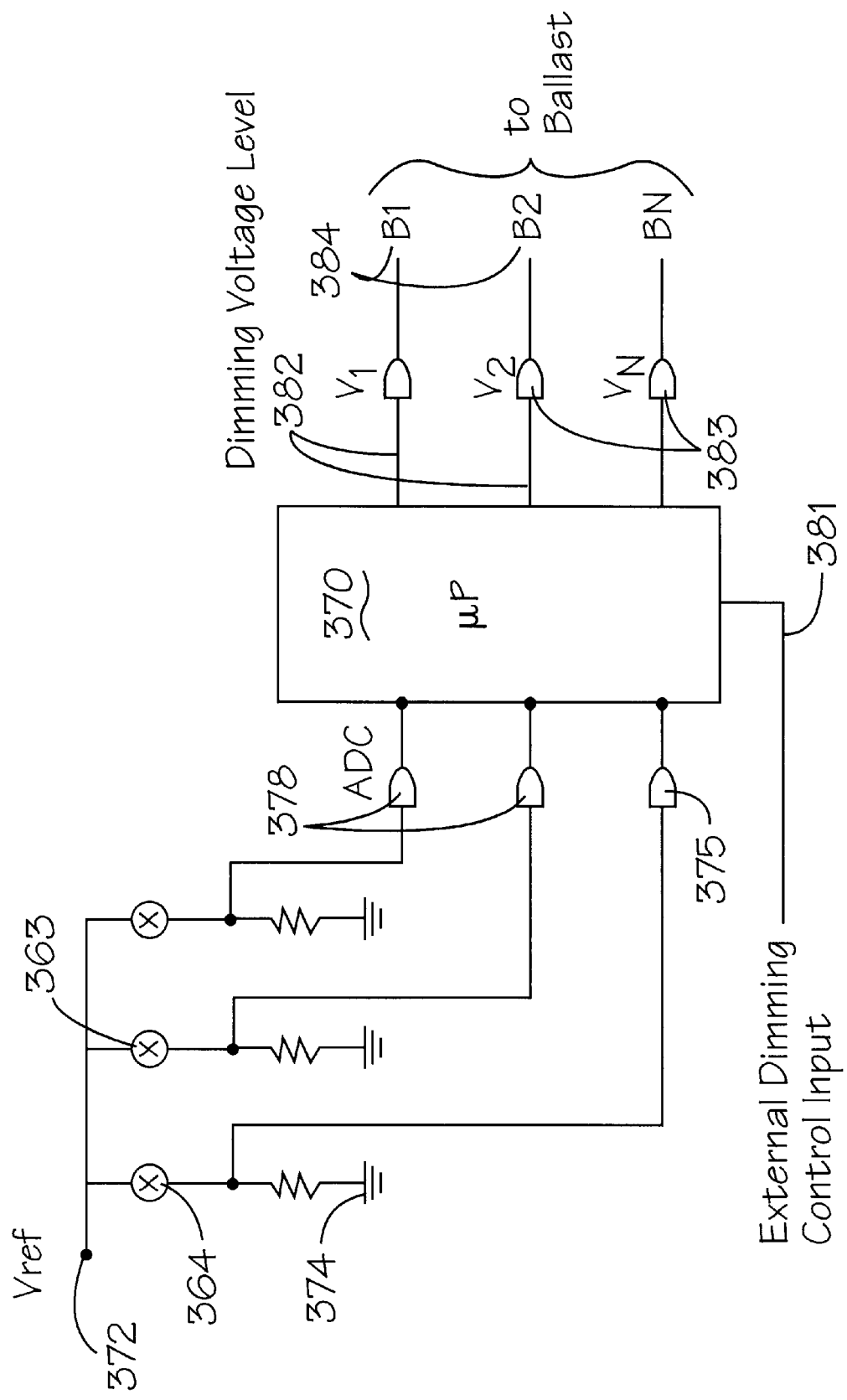
FIG. 12 is an electrical schematic diagram illustrating the dimming ballast control logic.

FIG. 12 shows the control system used for dimming the lamps individually or in groups. The control again is through lookup tables in the microprocessor 370. Lamp temperature digital data 378 is fed to the microprocessor 370, as previously shown. Ballasts 26 have a dimming feature such that the output of a ballast 26 is proportional to a DC input voltage 384. The digital output 382 of the microprocessor 370 is converted to the appropriate ballast voltage 384 via a digital-to-analog converter 383. Each lamp 23 may be driven by one ballast 26. Alternatively, the lamps 23 may be ganged, so that one ballast 26 can drive several lamps 23.

In simplest form, the ballasts 26 are all given the same dimming voltage 384. The dimming voltage 384 is controlled by one sensor 371 (the same one used for fan control) and the external brightness command 381. Dimming voltage 382 and fan speed voltage 379 are determined from a lookup table, the inputs for which are temperature sensor data 378 and brightness setting 381. Brightness increases based on input 381, as long as the average maximum temperature does not exceed the ideal. Brightness can be decreased by external input. Microprocessor output 382 to the ballasts is decreased accordingly. In addition, fan speed data 379 is lowered to a predetermined level based on a new lower ideal temperature that has been empirically determined by actual testing.

Figure 13:
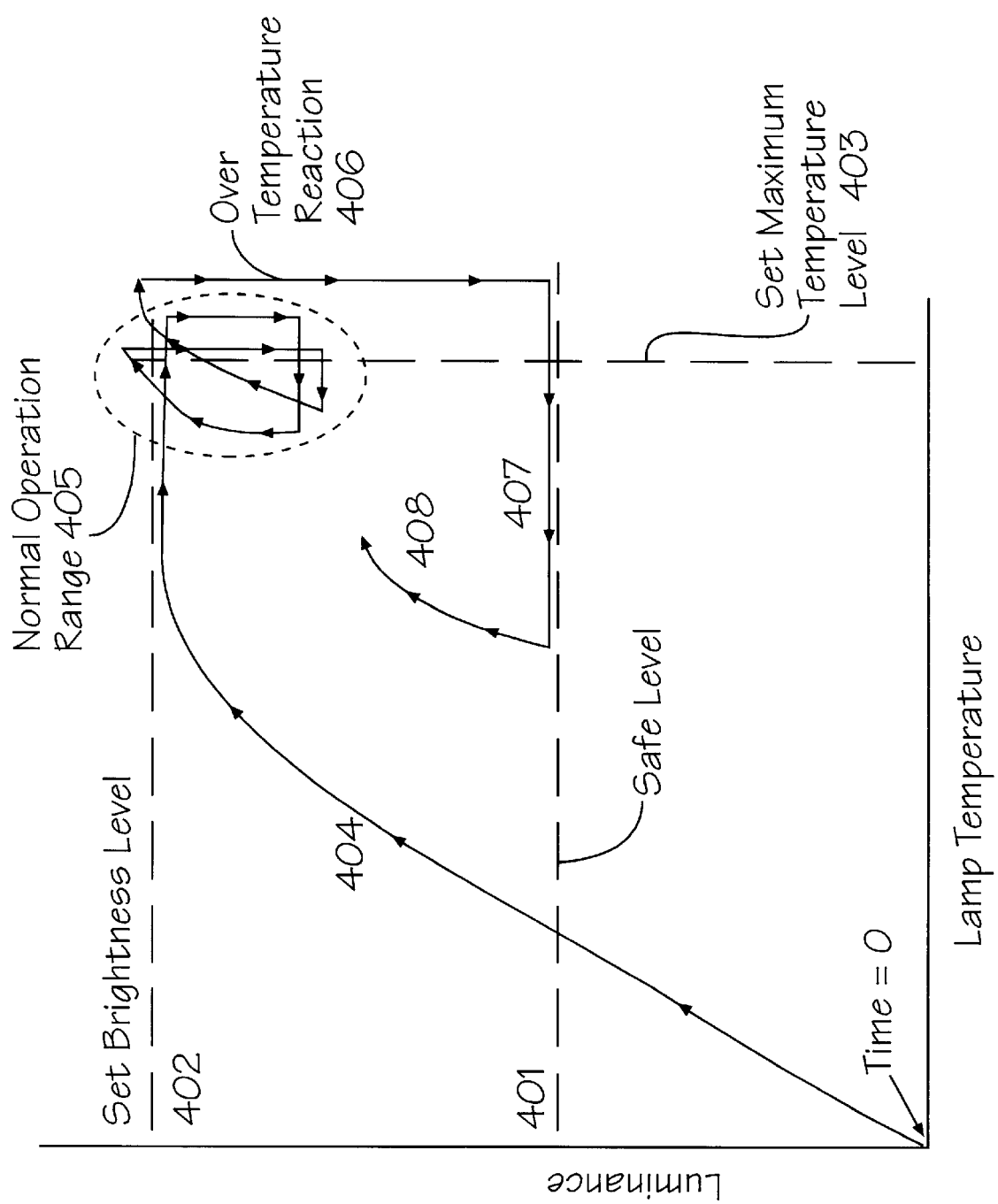
FIG. 13 graphically illustrates temperature control operation characteristics of the back light control of the present invention.

Referring now to FIG. 13, normal operation of the back light 21 is shown along with a safe mode operation sequence of events. The normal operation of the back light module 21 begins when initially turned on. Fan speeds and dimming output data are set at predetermined initialization levels. As the unit heats up, lamp temperature follows curve 404 towards the preset brightness level 402 and upper operating temperature level 403.

As the temperature level 403 is reached, power to the lamps 23 is reduced incrementally in steps via the dimming output data. When temperature reaches an acceptable lower operating temperature, the fan speed is incrementally increased. This area of control on the curve is the normal operation area, depicted by reference numeral 405. In the event of an over temperature condition 406, the lamp power is reduced via the dimming output data level to a predetermined safe power (brightness) level 401. The lamp temperature then drops, following path 407. When the temperature is in a safe zone, the lamp power is again increased, following curve 408 towards the normal operating area 405. If this over temperature condition reoccurs a predetermined number of times, a shut down occurs.

Since other optical configurations can be formulated to fit particular operating specifications and requirements, it will be apparent to those skilled in the art that the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims:

1. A high-output back light module for use with a tiled, flat-panel display having visually imperceptible seams, comprising:
    a) a housing defining a lamp cavity having optically-reflective interior side surfaces, a highly optically reflective, substantially planar rear surface and an open, front light-emitting surface defining an illuminated area;
    b) an array of fluorescent lamps disposed horizontally within said cavity; and
    c) lamp control means comprising an electronic ballast circuit operatively connected to said array of lamps to selectively provide power thereto;
whereby said power is selectively provided to said lamp array so as to maximize light output therefrom.

2. The high-output back light module for use with a tiled, flat-panel display having visually imperceptible seams as recited in claim 1, further comprising a highly reflective rear surface that further comprises:
    d) a back plane having a highly spectrally reflective coating thereupon;
    e) a layer of textured, diffusing, reflective paint disposed upon said highly spectrally reflective coating; and
    f) a layer of Teflon® material impregnated with titanium dioxide and having a thickness chosen to maximize reflectivity of said Teflon® layer, disposed over said layer of textured, reflective paint.

3. The high-output back light module for use with a tiled, flat-panel display having visually imperceptible seams as recited in claim 2, wherein said array of fluorescent lamps is located at a predetermined, optimized distance from said reflective rear surface.

4. The high-output back light module for use with a tiled, flat-panel display having visually imperceptible seams as recited in claim 3, wherein said array of fluorescent lamps comprises a predetermined number of fluorescent lamps of a predetermined type, each having a lamp diameter, chosen to maximize the light output of said back light module and to establish substantially full efficacy in said lamp cavity.

5. The high-output back light module for use with a tiled, flat-panel display having visually imperceptible seams as recited in claim 4, wherein said fluorescent lamps are spaced apart from one from another at a predetermined, inter-lamp spacing; said array of lamps being located a predetermined, optimized distance from said back plane, said distance being functionally related to at least one of the parameters: said lamp diameter, said lamp type and said inter-lamp spacing.

6. The high-output back light module for use with a tiled, flat-panel display having visually imperceptible seams as recited in claim 5, wherein said inter-lamp spacing between each lamp of said array of fluorescent lamps is substantially equal.

7. The high-output back light module for use with a tiled, flat-panel display having visually imperceptible seams as recited in claim 5, further comprising a high-transmittance exit diffuser placed proximate said open, front light-emitting surface.

8. The high-output back light module for use with a tiled, flat-panel display having visually imperceptible seams as recited in claim 7, wherein said high-transmittance exit diffuser produces a substantially Lambertian distribution.

9. The high-output back light module for use with a tiled, flat-panel display having visually imperceptible seams as recited in claim 7, further comprising light collimating means placed proximate said open, front light-emitting surface and said exit diffuser, whereby the light output of said back light module is maximized while reducing luminance gradients across said illuminated area below a predetermined value.

10. The high-output back light module for use with a tiled, flat-panel display having visually imperceptible seams as recited in claim 9, further comprising brightness-enhancing means disposed proximate said light collimating means.

11. The high-output back light module for use with a tiled, flat-panel display having visually imperceptible seams as recited in claim 10, wherein said brightness-enhancing means comprises two brightness-enhancing films (BEFs), each having an operational orientation, said BEFs being arranged such that their respective operational orientations are in an orthogonal relationship to one another.

12. The high-output back light module for use with a tiled, flat-panel display having visually imperceptible seams as recited in claim 9, wherein said collimating means comprises an array of open cells having a regular, repeating cell geometry and a thickness defining a cell depth.

13. The high-output back light module for use with a tiled, flat-panel display having visually imperceptible seams as recited in claim 12, wherein said cell geometry and said thickness define a cell width and a cell depth.

14. The high-output back light module for use with a tiled, flat-panel display having visually imperceptible seams as recited in claim 13, wherein said cell width and said cell depth have an aspect ratio therebetween, said aspect ratio defining a cut-off angle.

15. The high-output back light module for use with a tiled, flat-panel display having visually imperceptible seams as recited in claim 13, wherein said cell width and said cell depth define cell walls.

16. The high-output back light module for use with a tiled, flat-panel display having visually imperceptible seams as recited in claim 13, wherein said cell walls are coated with a light-absorbing coating.

17. The high-output back light module for use with a tiled, flat-panel display having visually imperceptible seams as recited in claim 16, wherein said light-absorbing coating comprises flat, black paint.

18. The high-output back light module for use with a tiled, flat-panel display having visually imperceptible seams as recited in claim 1, wherein said lamp control means comprises lamp temperature regulation means whereby the surface temperature of each of said lamps of said array of fluorescent lamps is maintained substantially within a predetermined range of operating temperatures.

19. The high-output back light module for use with a tiled, flat-panel display having visually imperceptible seams as recited in claim 18, wherein said lamp temperature regulation means comprises at least one from the group: heat sinks, dimming controls and louvers.

* * * * *